INVENTORS
ALEC DAVID YOUNG, GEOFFREY MICHAEL LILLEY &
ROBERT WESTLEY

BY *Stevens, Davis, Miller & Mosher*
ATTORNEYS

INVENTORS
ALEC DAVID YOUNG, GEOFFREY MICHAEL LILLEY
and ROBERT WESTLEY

BY *Stevens, Davis, Miller & Mosher*
ATTORNEYS

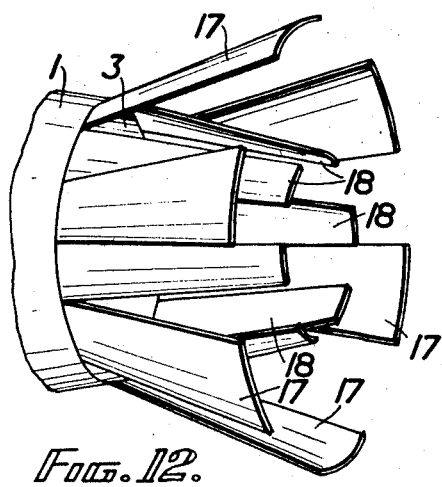
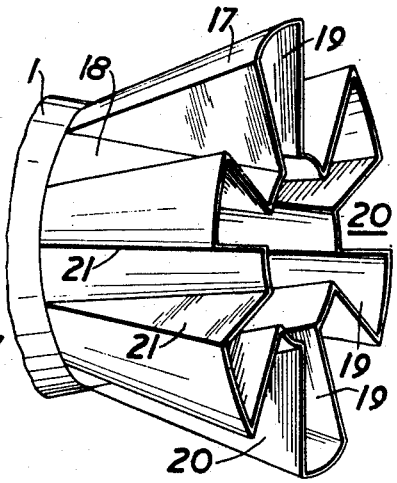
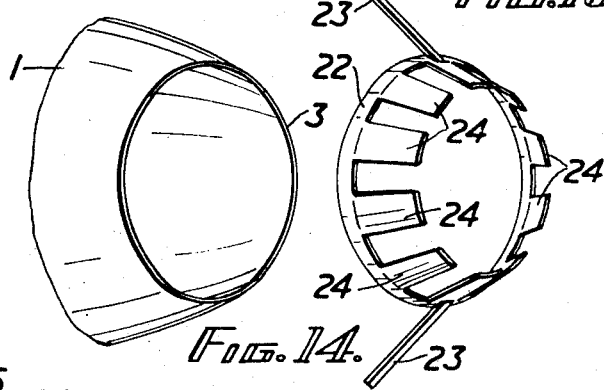
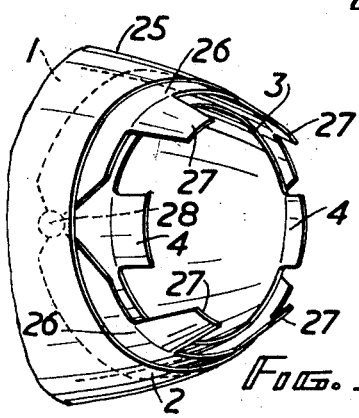
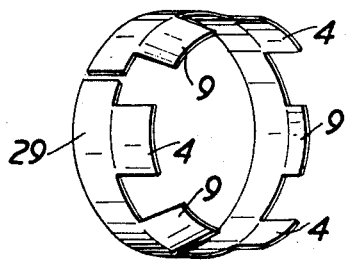

INVENTORS
ALEC DAVID YOUNG, GEOFFREY MICHAEL LILLEY
and ROBERT WESTLEY

BY *Stevens, Davis, Miller & Mosher*
ATTORNEYS

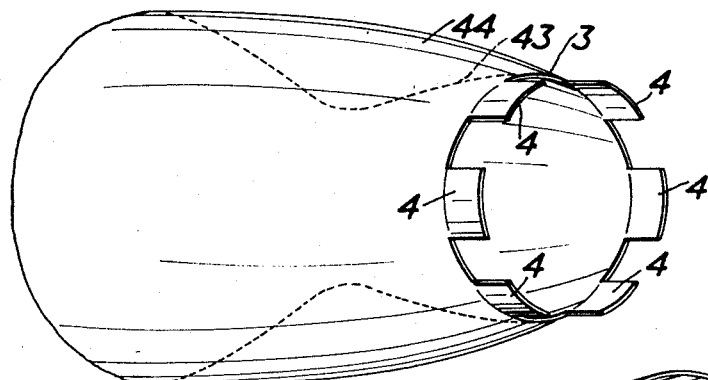
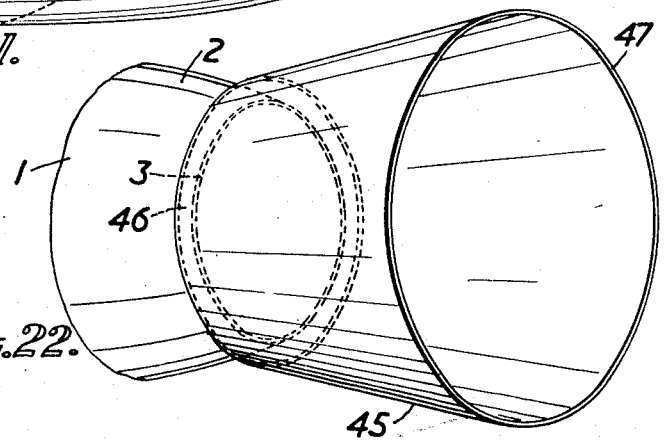
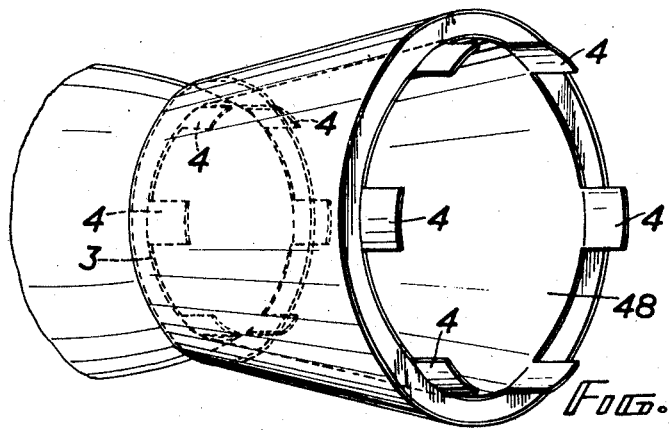

United States Patent Office 3,153,319
Patented Oct. 20, 1964

3,153,319
JET NOISE SUPPRESSION MEANS
Alec David Young, The Sycamores, Whitehall Lane,
Buckhurst Hill, and Geoffrey Michael Lilley, 10 West
Road, Wharley End, Cranfield, Bletchley, England, and
Robert Westley, 15½ Fourth Ave., Ottawa, Ontario,
Canada
Continuation of application Ser. No. 364,879, June 29,
1953. This application Mar. 19, 1959, Ser. No. 800,438
6 Claims. (Cl. 60—35.6)

This invention is concerned with noise suppression of propulsive jet of an aircraft rocket, ramjet or gas turbine continuation of our co-pending application Serial No. 364,879, filed 29th June, 1953, and now abandoned.

The particular instance of the noise created by the propulsive jet of an aircraft rocket, ramjet or gas turbine engine is one which is now well to the fore. Such a jet diverges in mixing with the atmosphere, the angle of divergence being dependent on the ratio of the pressure at the nozzle exit to the atmospheric pressure. When the jet exit velocity is greater than sonic velocity a train of shock waves will exist in the jet. The noise suppression means forming the subject of the present invention is applicable in cases where shock waves do and do not appear in the jet.

It will be appreciated that when a jet emerges into the atmosphere from an aircraft jet engine there is a steep velocity gradient across the boundary of the jet. It can be shown theoretically that the intensity of noise produced by a jet is closely associated with this velocity gradient. If the velocity of the gases leaving a jet engine is substantially reduced then the noise created by that engine may therefore be expected to be much less than with a comparable engine having a greater jet velocity. The velocity gradient could, on the same basis, also be reduced by spreading out a jet more rapidly than the normal divergence provides, i.e., by increasing the mixing region between the issuing jet and the ambient fluid.

Experimental evidence has now been accumulated by the applicants which supports these theoretical deductions. Thus it has been found that the sound field produced by a jet is largely caused by the strong vorticity existing in the flow near to and beyond the nozzle exit. Thus, the coupling of eddying flow and large velocity gradients, whether lateral as in the mixing region of the jet, or longitudinal as across shock waves, has been found to give rise to intense noise. The sound field displays directional properties the character of which varies with the frequency of the noise produced and the jet speed at the nozzle exit.

It has been found possible to effect appreciable reduction of jet noise intensity without introducing seriously disadvantageous secondary effects, such as considerable loss of thrust with an aircraft jet engine, which might well have been expected.

The invention provides a noise suppressing jet nozzle in which means are provided at or adjacent to the nozzle exit for modifying the boundary of an issuing jet in such manner that the mixing region between that jet and the ambient fluid is increased compared with the corresponding region for a plain nozzle exit.

Noise suppression has been carried out in model and full scale tests, an average reduction of approximately ten decibels over the audio frequency range having been achieved with a gas turbine jet engine. With an engine producing a noise intensity of about 130 decibels above the threshold of audibility such a reduction has considerable utility. The unsuppressed engine creates a noise which is extremely distressing to a human being at a distance of a hundred feet from the nozzle exit and which is, moreover, capable of causing such structural vibration that fatigue failure may become a real danger. A similar engine to which an embodiment of the present invention has been applied is noticeably quieter, causes no such distress and is expected largely to overcome the vibrational fatigue problems. The embodiment mentioned comprises the provision of teeth extending in the general direction of the issuing jet beyond the nozzle exit. It has been found preferable for one or more of such teeth to protrude into the jet, for example by being inclined inwards at an angle of approximately 30° to the jet direction.

Various shapes and arrangements of teeth are possible and some may be made adjustable. A variable area nozzle effect may be produced with adjustable teeth.

Apertures distributed around the perimeter of the nozzle upstream of the exit thereof may have similar effect to the extending teeth. Another alternative embodiment, which is of present considered to be specially suitable for the choked nozzle case, has a finely perforated nozzle wall immediately upstream of the main exit. For the same case, a diffuser extension, into the upstream end of which the nozzle proper protrudes, may be appropriate.

A noise suppressing device, having the effect of increasing the mixing region as stated above, may be separately fabricated and attached to or associated with a jet nozzle.

The invention will now be described, by way of example only, with reference to a number of embodiments thereof, shown in the accompanying drawings in which:

FIGURES 1 to 13 show a number of nozzle exit tooth configurations for suppression of jet noise, of jet propulsion engines.

FIGURE 14 shows a tooth arrangement which is supported independently of the nozzle exit.

FIGURE 15 shows an application of the invention to a jet engine propulsion nozzle equipped with an "eyelid" type variable area nozzle.

FIGURE 16 shows a toothed ring for attachment to a jet nozzle for noise suppression purposes.

FIGURE 21 shows a noise suppressor nozzle exit from a convergent/divergent nozzle.

FIGURES 22 and 23 show arrangements of a diffuser extension to a jet nozzle which are particularly suitable for noise suppression of a choked nozzle.

Figure 1:
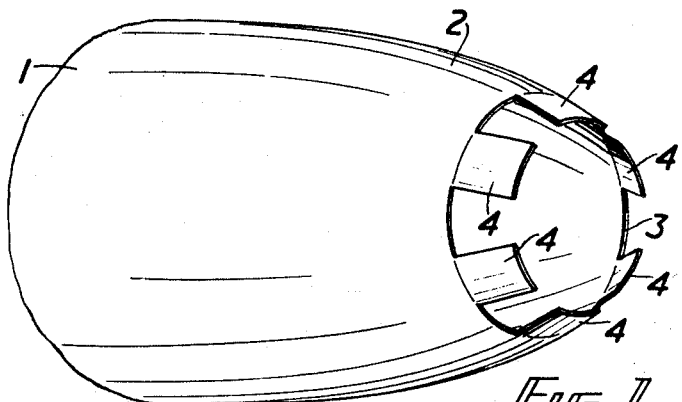
Figure 2:
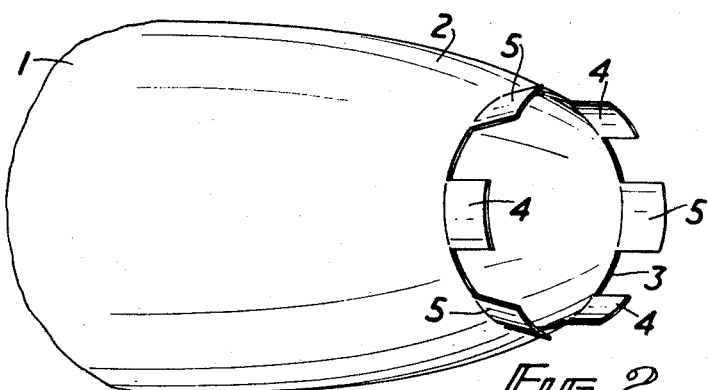
Figure 3:
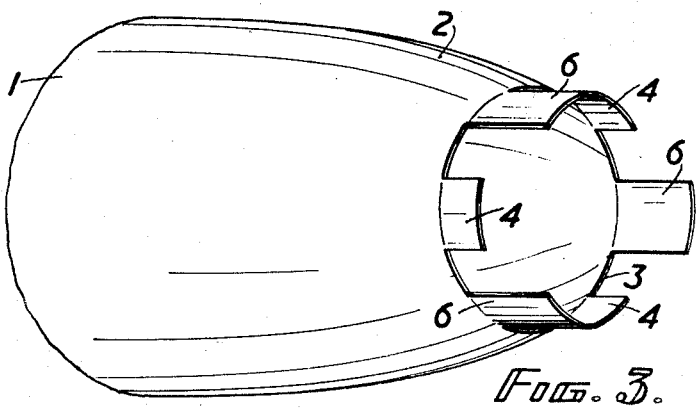
Figure 4:
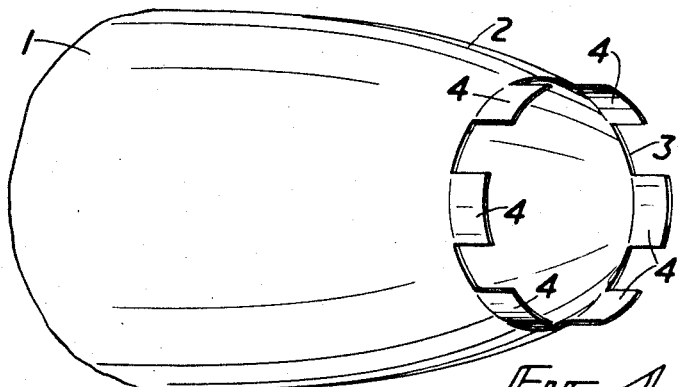
Figure 5:
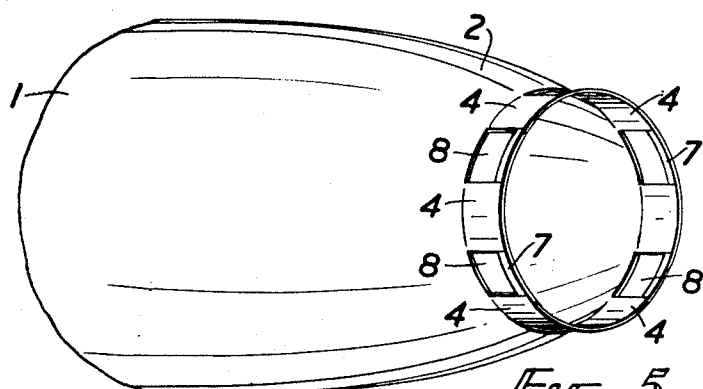
Figure 6:
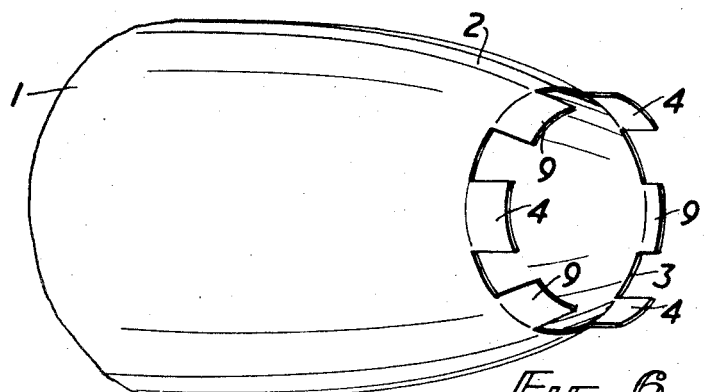

Turning first to FIGURE 1, the downstream end of the jet pipe of a gas turbine jet propulsion engine. The pipe 1 terminates in a convergent part 2 and a nozzle exit shown at 3. Whereas the normal and conventional jet pipe orifice is a plain circular one it will be noticed that in this case there is provided a number of teeth 4 distributed around the perimeter of the nozzle exit. They extend in the general direction of the issuing jet and have the effect of modifying the boundary of that jet so that the mixing region between the jet and the atmosphere is extended compared with the corresponding region in the absence of the teeth 4. It will be noticed that the six teeth shown are all bent slightly inwards towards the axis of the jet. This has been found to be a satisfactory way of decreasing the jet noise but it does also somewhat decrease the effective nozzle exit area. This may unsatisfactorily increase the jet pipe temperature and a compromise may have to be resorted to. One such compromise is shown in FIGURE 2 in which the arrangement is generally similar but that some of the teeth 4 are extending downstream parallel to the jet axis whilst others are inclined a little away from that axis. The two kinds of teeth are arranged alternately around the perimeter of the nozzle exit. It will be noticed that the teeth 5 are inclined outwards whilst the remaining teeth are parallel to the jet axis. In another alternative arrangement all the teeth are parallel to the jet axis and the opportunity is taken in FIGURE 3 to show that all these teeth need not necessarily be of the same length. The teeth 6 in this instance are double the length of the remaining teeth 4. The advantages of one configuration of teeth over another in any particular circumstance depends upon the nozzle exit size and shape and the jet velocity for that particular application. Also the number of teeth may be varied to suit particular circumstances. In FIGURES 4 and 5 there are shown two arrangements in which six teeth in line with the issuing jet axis are proposed. In the FIGURE 5 arrangement a shroud 7 has been added to the downstream tips of the teeth 4 mainly for the purpose of increasing the mechanical strength of the teeth. One effect of this is to transfer the nozzle exit to a plane slightly downstream of its original position. Upstream of that new position there are then a number of apertures 8, being the spaces between the teeth, distributed about the perimeter of the nozzle. In FIGURE 6 there is shown an arrangement that has proved to be extremely satisfactory in full scale tests upon a gas turbine jet propulsion engine. In this instance three of the teeth 4 at 120° intervals around the perimeter of the nozzle exit are in line with the issuing jet axis whilst the remaining teeth 9 making up a symmetrical arrangement are inclined in towards the jet axis at an angle of approximately 30°.

Figure 7:
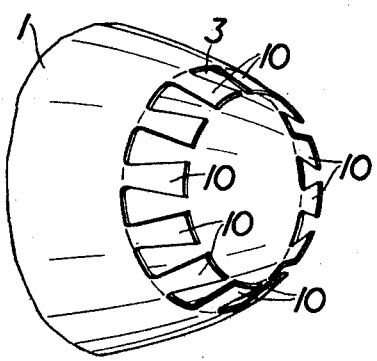
Figure 8:
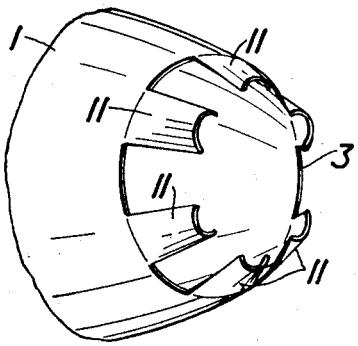
Figure 9:
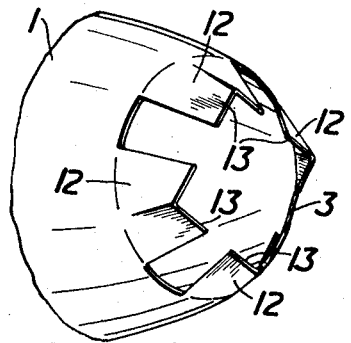

In FIGURES 7 to 13 there are shown various other configurations of teeth which are proposed for the purpose of noise suppression of jets. The tapering tooth construction is shown in FIGURE 7 in which the teeth 10 increase in width as they extend away from the nozzle exit. These teeth are shown all to be slightly bent in towards the jet axis. In FIGURE 8 the teeth 11 each take a fluted shape at their downstream ends. In FIGURE 9 the teeth 12 have a generally circular arc cross section at their upstream ends and are right angled section at their downstream ends. The effect of this is to modify the effect of the circular nozzle exit 3 and to provide for the main part of the issuing jet a square formation due to the four angled teeth ends 13.

Figure 10:
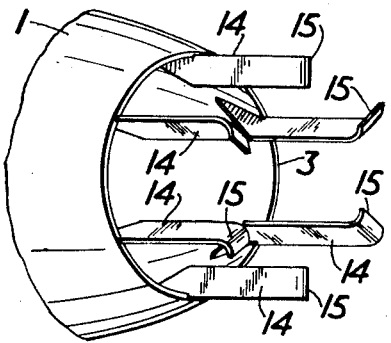
Figure 11:
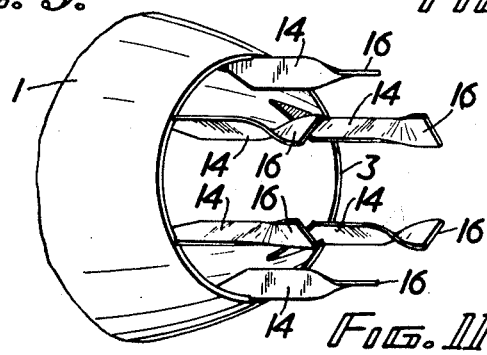

The toothed constructions so far described have all had teeth extending away from the nozzle exit in a general plane of the pipe of which they have formed a continuation.. In FIGURES 10 and 11 radial teeth 14 are proposed and these have modified downstream ends which have the effect of imparting swirl to the outer regions of the issuing jet. In FIGURE 10 it will be noted that the downstream ends of the radial teeth 14 are curved as shown at 15. In FIGURE 11 the downstream ends of the radial teeth 14 are twisted as shown at 16 into planes generally tangential to the jet boundary.

In all of the constructions shown up to now there have been spaces between adjacent teeth at the nozzle exit boundary. There are no such spaces in the construction shown in FIGURES 12 and 13. Teeth are arranged continuously around the perimeter of the nozzle exit occupying the whole of the perimeter. Twelve teeth are shown of which alternate ones 17 are inclined outwards away from the jet axis and the intervening ones 18 are all inclined towards the jet axis. By filling in the radial gaps between adjacent teeth 17 and 18 in FIGURE 12 the construction shown in FIGURE 13 is obtained. The jet on leaving a pipe 1 is constrained to flow through the channels 19 within the teeth 17. Hence the jet emerges into the atmosphere with a generally star cross section. If the construction is assumed to be passing through the atmosphere in the direction to the left of the figure then it will be clear that the atmospheric air will flow downstream through the channels 20 between the teeth 18 and the radial connecting walls 21. Intimate mixing of the jet with the atmosphere is therefore assured and the effect of the teeth 17 and 18 is such as to increase the mixing region compared with the plain nozzle exit. In some applications it may not be desirable to have the means for increasing the mixing region fixed to the jet nozzle exit or even attached thereto. In FIGURE 14 therefore the arrangement is indicated of a separately mounted noise suppressor associated with the jet nozzle exit 3 but situated some way downstream thereof. A ring 22 conforming generally to the boundary of the issuing jet is supported upon struts 23 independently of the jet pipe 1. The downstream side of the ring 22 is equipped with teeth 24 which correspond generally with the teeth shown in FIGURE 1. The effect is similar in that the issuing jet after passing through the ring 22 has its mixing region thereafter considerably extended by the provision of the teeth and this has the desired noise suppressing effect.

In FIGURE 15 the application of the present invention to the case of a gas turbine jet propulsion engine equipped with a variable area nozzle of the eyelid or clam shell type is shown. The jet pipe 1 can be seen enclosed within a cell 25. The nozzle exit 3 is equipped with two teeth in diametrically opposite positions these teeth extending in the direction of the nozzle, that is being inclined inwardly slightly towards the jet axis due to the convergence of the nozzle at its exit.

The eyelid shutters 26 are shown in their retracted position between the convergent nozzle 2 and the nacelle 25. The downstream edges of these shutters have inwardly inclined teeth 27 for noise suppression. The shutters are pivotable about the bearings 28 in conventional fashion for such shutters. The actuating mechanism is also conventional and is not shown. It will be understood that the teeth 4 and 27 co-operate to increase the mixing region for an issuing jet compared with a normal variable area nozzle of this type.

Although the majority of the preceding constructions have shown toothed jet nozzles which are integral structures with the jet pipe itself the noise suppression device may be separately made and fitted to a conventional nozzle. Such an attachable noise suppression device is shown in FIGURE 16. The arrangement has an effect similar to that of the FIGURE 6 construction for six teeth are provided, three of which are inwardly inclined compared with the mounting ring 29. This ring is split and may be easily fitted on to a conventional jet nozzle. If that nozzle is convergent at its exit the ring 29 can be constructed with a base diameter greater than that at the bottom of the teeth so as to have a similar convergence. The teeth 4 and 9 may be unitary with the ring 9.

Figure 17:
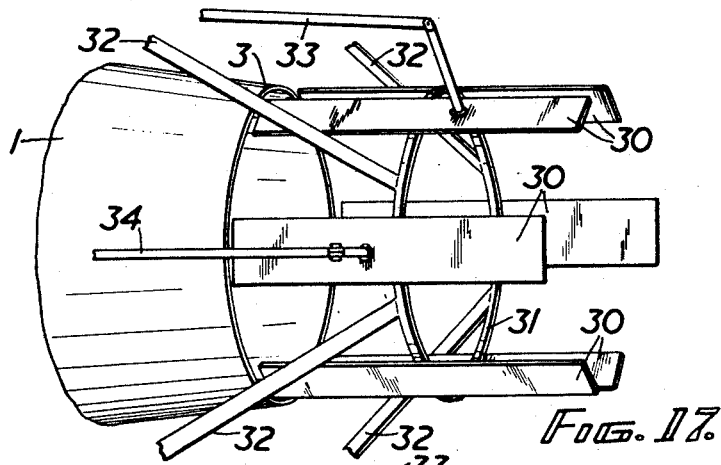
FIGURES 17 and 18 show the operation of an independently supported noise suppressor downstream of a nozzle exit.
Figure 18:
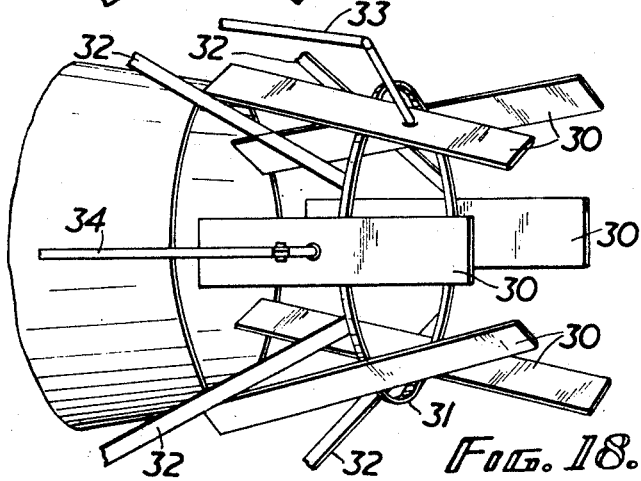

FIGURES 17 and 18 illustrate a more complicated toothed arrangement for fitting downstream of a jet nozzle exit. There will be seen a number of teeth 30 each pivotted about its mid point and mounted upon a ring 31. This ring is supported independently of the jet nozzle by struts 32. The controlling mechanism for two of the teeth are shown as pivotted links 33 and 34. The link 33 is attached to the downstream end of its tooth whilst the link 34 is attached to the upstream end of its tooth. Simultaneous movement of these links, 33 to the right and 34 to the left, cause the respective teeth to be inclined towards the jet axis. Alternate teeth are connected to mechanisms operating as those just described so that after operation the teeth are as shown in FIGURE 18. In an alternative construction all the teeth 30 may have their downstream ends inclined inwardly towards the jet axis.

Figure 19:
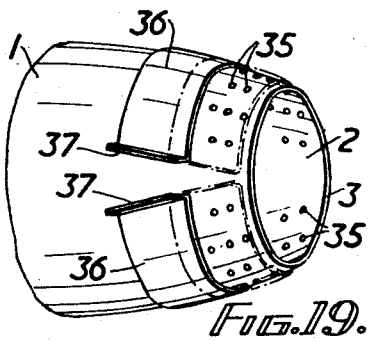
FIGURE 19 shows an apertured jet nozzle with a sliding obturator mechanism.

A noise suppressing jet nozzle arrangement without teeth is shown in FIGURE 19. In this instance there are a number of apertures 35 around the perimeter of the convergent part 2 of the nozzle and these allow the boundary layer of the jet to escape and mix with the atmosphere. The effect is much like that of the FIGURE 5 construction but there are more and smaller apertures upstream of the nozzle exit 3. A variable exit area effect may be achieved through operation of the slidable obturator elements 36, whose fully closed position is shown dotted. The elements 36 have flanges 37 which are preferably slidably mounted on the inside wall of a nacelle surrounding the jet pipe.

Figure 20:
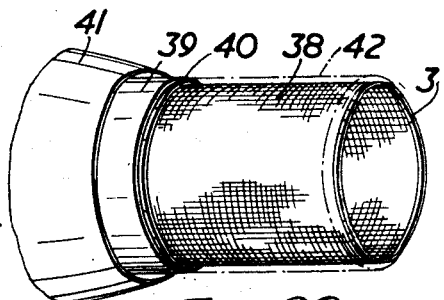
FIGURE 20 shows a jet nozzle having a finely perforated wall upstream of the nozzle exit.

The noise suppression arrangement shown in the remaining FIGURES 20 to 23 have been particularly designed for use with choked nozzles, that is those in which supersonic exit velocities are achieved. In such cases there is a pressure difference available between the jet as it reaches the nozzle exit and the surrounding fluid, i.e. the atmosphere in the case of a jet propulsion engine. In the embodiment of FIGURE 20 that pressure difference is made use of to cause the boundary layer of the jet to pass outwardly through the finely perforated or gauze wall 38 immediately upstream of the nozzle exit 3. That spread outwardly of the jet both reduces the pressure difference at the nozzle exit 3 and enables more speedy mixing with the atmosphere to take place. The shock waves downstream of the exit 3 are appreciably lessened in intensity.

The arrangement shown in FIGURE 20 has an obturator element 39 slidably mounted over the downstream end of the jet pipe, the edge of which can be seen at 40. The obturator element normally lies within the nacelle 41. In its fully extended position, indicated by the dotted lines 42 the perforated wall 38 is closed.

A more conventional supersonic nozzle is of convergent-divergent construction and such a nozzle is indicated by dotted lines 43 in FIGURE 21. This throat construction is contained within a nacelle 44. It will be seen that the outlet end 3 of this nozzle is able to be usefully equipped with noise suppressing teeth 4 as in previous arrangements.

Another nozzle arrangement suitable for choked flow is indicated in FIGURE 22. In this construction a conventional jet pipe 1 with convergent portion 2 leads to the usual nozzle exit at 3. This exit 3 is however positioned so that it protrudes into a divergent extension piece 45, a gap 46 being left between the perimeter of the nozzle exit 3 and the inner wall of the diffuser extension 45 in the plane of the nozzle exit. The choked flow issuing from the nozzle exit 3 tends to extend its boundary to coincide with the inner wall of the diffuser extension just downstream of the exit 3. This results from the pressure difference between the issuing flow and the air trapped in the re-entrant between the nozzle and the diffuser. Providing the diffuser is not of too large a cone angle in the divergent direction the flow stays circumscribed by the diffuser wall and the mixing region of the jet issuing from the downstream end 47 of the diffuser extension is greater than would normally have been attained because of the effect of the nozzle exit inside the diffuser. In addition the shock waves of the emerging jets are lessened in strength because of the permissive expansion of the flow area within the diffuser.

The noise reduction effect of the FIGURE 22 arrangement can be increased by the provision of teeth of the general kind described above either at the extension edge 47 or at the nozzle exit 3 or at both positions. The latter possibility is illustrated in FIGURE 23. In this figure the diffuser extension 46 has a double wall construction, the inner wall 48 being perforated and the space between the two being filled with sound insulating material.

In discussing the tooth embodiments of the invention above, in most cases the teeth have been rectangular in shape. It will be understood however that teeth of other shape may be employed providing they extend the mixing region between the jet and the ambient fluid in the desired manner. Where a tooth ring is associated with the jet nozzle and positioned just downstream of the nozzle exit, as is the case with FIGURE 14, the teeth might be mounted on the upstream side of the ring. Such teeth would still extend in the general direction of the issuing jet and it is desired to make clear that it is not essential that the teeth should have their bases at their upstream ends.

We claim:

1. Apparatus for partially inhibiting the generation of noise created by a high velocity gaseous jet, comprising a jet pipe nozzle ending, tooth members separated from one another along their length in the direction of jet flow and attached around the periphery of said nozzle ending with their upstream ends closely adjacent, the upstream end of each tooth member being of different width from the downstream end, the tooth members being attached in such manner that adjacent tooth members, while extending in the general direction of the issuing jet, are inclined with respect to one another and further comprising wall parts joining adjacent tooth members throughout their length, the outwardly inclined tooth members being wider at the downstream end then at the upstream end thereof, the downstream end of the tooth members and wall parts being open to the atmosphere and free of obstructions radially outwardly thereof.

2. A propulsive jet nozzle having upstream and downstream ends, the downstream end being open to the atmosphere and free of obstructions radially outwardly thereof, the nozzle having radially extending corrugations the width of which increases towards the radially outer portions thereof, the corrugations being circumferentially spaced so that the radial medians of the corrugations are less than 90° apart.

3. A propulsive jet nozzle comprising a boundary wall separating the jet from the surrounding gaseous fluid, the wall having an upstream end and a downstream end, the downstream end being open to the atmosphere, free of obstructions radially outwardly thereof and having radially extending corrugations, the corrugations being circumferentially spaced so that the cross-sectional area of a corrugation is at least of the same order as that of the cross-sectional area of a space between the corrugations, in any one cross-sectional plane, whereby mixing between the jet issuing from the downstream end of a corrugation and the atmosphere is rapidly promoted.

4. A propulsive jet nozzle comprising a boundary wall separating the jet from the surrounding gaseous fluid, the wall having an upstream end and a downstream end, the downstream end being open to the atmosphere and free of obstructions radially outwardly thereof, the wall having radially extending corrugations circumferentially spaced so that the cross-sectional area of a corrugation is substantially equal to the cross-sectional area of a space between the corrugations, in any one cross-sectional plane, and each corrugation having a circumferential width at its radially outer end greater than the circumferential width at its radially inner end, the total cross-sectional area of the corrugations being a major proportion of the cross-sectional area of the nozzle.

5. A noise attenuating jet nozzle comprising a boundary wall separating the jet from the surrounding gaseous fluid, the wall having an upstream end and a downstream end, the downstream end being open to atmosphere, free of obstructions and radially outwardly thereof and having radially extending corrugations, the radially outer portions of which are divergent from the upstream end to the downstream end with respect to the longitudinal axis of the nozzle, whereby the jet flow through the radially outer portions is induced to issue into the atmosphere along a path inclined away from the general direction of the issuing jet, the corrugations being circumferentially spaced so that the radial medians of the corrugations are less than 90° apart, the spaces between the corrugations forming passages, the radially inner portions of which are convergent from the upstream end to the downstream end with respect to the longitudinal axis of the nozzle, the surrounding atmosphere being induced to flow through the radially inner portions to issue into the jet along a path inclined towards the general direction of the issuing jet, whereby mixing of the issuing jet and the atmosphere is rapidly promoted.

6. A propulsive jet nozzle having upstream and downstream ends, the downstream end being open to the atmosphere and free of obstructions radially outwardly thereof, and six corrugations extending radially of the nozzle, the radially outer portions of which are divergent from the upstream end to the downstream end with respect to the longitudinal axis of the nozzle, and the width of each corrugation increasing towards the radially outer portion.

References Cited in the file of this patent

UNITED STATES PATENTS

| | | |
|---|---|---|
| 107,603 | Faber du Faur | Sept. 20, 1870 |
| 1,137,767 | Leblanc | May 4, 1915 |
| 1,949,041 | De Legabbe | Feb. 27, 1934 |
| 2,382,386 | Arms | Aug. 14, 1945 |
| 2,396,208 | Serre et al. | Mar. 5, 1946 |
| 2,426,833 | Lloyd | Sept. 2, 1947 |
| 2,652,127 | Johnston | Sept. 15, 1953 |
| 2,664,700 | Benoit | Jan. 5, 1954 |
| 2,704,440 | Nicholson | Mar. 22, 1955 |

FOREIGN PATENTS

| | | |
|---|---|---|
| 997,262 | France | Sept. 12, 1951 |
| 1,773 | Great Britain | July 6, 1871 |
| 766,986 | Great Britain | Jan. 30, 1957 |
| 975 | Great Britain | Sept. 10, 1914 |

OTHER REFERENCES

NACA Technical Note 4317, "Turbojet Engine Noise Reduction With Mixing Nozzle-Ejector Combinations," by Coles, Mihaloew and Callaghan, August 1958.

"Proceedings of the Royal Society of London," vol. 211, pages 564-587, published March 20, 1952.